US007249952B2

(12) United States Patent
Ranta et al.

(10) Patent No.: US 7,249,952 B2
(45) Date of Patent: Jul. 31, 2007

(54) METHODS AND APPARATUS FOR SIMULATING DENTAL PROCEDURES AND FOR TRAINING DENTAL STUDENTS

(75) Inventors: John F. Ranta, Princeton, MA (US); Walter A. Aviles, San Diego, CA (US); R. Bruce Donoff, Chestnut Hill, MA (US); Linda P. Nelson, West Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 09/970,071

(22) Filed: Oct. 3, 2001

(65) Prior Publication Data

US 2002/0119432 A1 Aug. 29, 2002

Related U.S. Application Data

(60) Provisional application No. 60/237,453, filed on Oct. 3, 2000.

(51) Int. Cl.
 *G09B 23/28* (2006.01)
(52) U.S. Cl. ..................................... 434/263
(58) Field of Classification Search ........ 434/262–264, 434/267, 275; 433/27
 See application file for complete search history.

(56) References Cited

U.S. PATENT DOCUMENTS 5,688,118 A * 11/1997 Hayka et al. ................. 433/27

| | | | |
|---|---|---|---|
| 5,898,599 A | 4/1999 | Massie et al. | |
| 6,088,020 A * | 7/2000 | Mor | 345/156 |
| 6,191,796 B1 * | 2/2001 | Tarr | 345/581 |
| 6,283,763 B1 * | 9/2001 | Matsuzaki et al. | 434/262 |
| 6,361,323 B1 * | 3/2002 | Beach et al. | 434/263 |

FOREIGN PATENT DOCUMENTS

WO WO 00/60571 A1 * 10/2000

OTHER PUBLICATIONS

Visualisation and reconstruction in dentistry Shimabukuro, M.H.; Minghim, R.; □□Information Visualization, 1998. Proceedings. 1998 IEEE Conference on, Jul. 29-31, 1998 pp. 25-31.*

(Continued)

*Primary Examiner*—Robert E. Pezzuto
*Assistant Examiner*—Cameron Saadat
(74) *Attorney, Agent, or Firm*—Sonia K. Guterman; Adam M. Schoen; Lawson & Weitzen, LLP.

(57) ABSTRACT

A training system using haptically enhanced simulations of dental procedures to provide the sensorimotor involvement needed for dental training. To provide touch feedback in combination with a realistic visual experience, the system integrates a haptic stylus interface for simulating the movement and feel of the tool-tip with a three-dimensional, stereoscopic display. The haptic stylus enables the dental student to orient and operate simulated dental tools. Working on a virtual model viewed in a stereo display, dental students can use a simulated pick to probe a tooth, or a simulated drill to prepare a tooth for cavity repair. The touch feedback is simulated by representing these dental instruments as force-to-a-point tools which map to haptic simulation procedures executed on a computer workstation that also provides the visual display.

30 Claims, 5 Drawing Sheets

OTHER PUBLICATIONS

Virtual teeth for endodontics training and practice Arnold, D.B.; Day, A.M; Goetz, M.R.; Courtenay, A.; Graham, H.I.; Information Visualization, 2000. Proceedings. IEEE International Conference on, Jul. 19-21, 2000 pp. 597-604.*

NASA Tech Briefs—Haptic Technologies' PenCAT/Pro 3D pen, Oct. 1998, www.nasatech.com/news/ntbprod1098.html, pp. 1.*

Massie and Salisbury, 1994, "The Phantom Haptic Interface: A Device for Probing Virtual Objects," Proceedings of the ASME Winter Annual Meeting, Symposium for Haptic Interfaces for Virtual Environment and Teleoperator Systems, Chicago, IL, Nov. 1994.

* cited by examiner

METHODS AND APPARATUS FOR SIMULATING DENTAL PROCEDURES AND FOR TRAINING DENTAL STUDENTS

CROSS REFERENCE TO RELATED APPLICATION

This application claims the benefit of the filing date of U.S. Provisional Application Ser. No. 60/237,453 filed on Oct. 3, 2000.

FIELD OF THE INVENTION

This invention relates to computer-assisted training systems and more particularly to a virtual reality system for realistically simulating dental procedures.

BACKGROUND OF THE INVENTION

For the past 80 years, dental students have used artificial ("Dentoform") teeth and jaws, along with real dental instruments, to develop expertise in cavity preparation and other procedures. There are at least the following shortcomings with this approach:
1. These Dentoform models lack the level of detail and material properties needed to exactly mirror real life teeth and procedures.
2. These Dentoform models do not allow the student's work to be quantified or graded accurately, hence standards are difficult to instill or maintain.
3. Real life experiences such as bleeding or tooth extraction cannot be simulated with Dentoform training models.

Due to these and other deficiencies, current training procedures require that dental students gain a portion of their required experience while practicing on patients. This is obviously less than optimal.

Computer simulation has promised to make medical education, including dentistry, quantifiable and scientific, and to make it possible for students to master procedures without the use of cadavers or the need to practice on live patients. However, computer simulation has not been effective for many types of medical training, including dentistry, because of the lack of true touch interaction. Utilizing classical, visual-only, computer simulations are not acceptable because a significant part of a dentist's learning is sensorimotor in nature. A dentist strongly depends on touch feedback from the tool tip for diagnosis and positional guidance during procedures.

Haptically enhanced simulations can provide the sensorimotor involvement needed for dental training. Moreover, if the simulation can provide a level of haptic realism equal to or better than the artificial-tooth-and-jaw-approach, it promises to be superior to the current physical Dentoform approach in simulating other aspects of procedures such as bleeding. In addition, virtual reality (VR) simulation offers "super-reality" training benefits that are not possible with either Dentoform models or live patients. For example, the student can repeat and playback procedures many times, precisely measure and quantify their results and even zoom in or work in x-ray mode to see their work in detail.

SUMMARY OF THE INVENTION

It is accordingly a principal object of the invention to provide a realistic simulation of dental procedures by using haptically enhanced simulations to provide the sensorimotor involvement needed for dental training.

A dentist strongly depends on touch feedback from the tool tip for diagnosis and positional guidance during procedures. To provide touch feedback in combination with a realistic visual experience, the present invention integrates a haptic stylus interface for simulating the movement and feel of the tool-tip with a three-dimensional, stereoscopic display.

The haptic stylus enables the dental student to orient and operate simulated dental tools. Working on a virtual model viewed in a stereo display, dental students can use a simulated pick to probe a tooth, or a simulated drill to prepare a tooth for cavity repair. The touch feedback is simulated by representing these dental instruments as force-to-a-point tools which map to haptic simulation procedures executed on a computer workstation that also provides the visual display.

The workstation computer generates a succession of stereoscopic display images at rapid refresh rates, which are viewed by the student through liquid crystal display stereo shutter glasses to yield a three-dimensional image of both the tooth material and the tool head.

The graphics display renders the tooth material volumetrically as a solid, and provides for the high speed calculation of drilling and filling procedures. The tool head is also rendered as a volume, which enables high speed collision detection. The tooth (molar) models, which may be supplied on diskettes or CD's, or downloaded via the Internet as a stereolithography files, may be selectively displayed in both healthy and decayed forms.

The training system display presents the user with menus for tool selection and operation, file load/save functions, and selecting view modes and application operations. NDH (non-dominant hand) use of keyboard and mouse is enabled for application interaction.

The present invention has the potential for providing a level of haptic realism equal to or better than the artificial-tooth-and-jaw-approach, and promises to be superior to the current physical fixture approach in simulating a rich variety of dental procedures. In addition, the simulation provided by the invention offers "super-reality" training benefits that are not possible with either plastic models or live patients, and permits the student to repeat and playback procedures many times, precisely measuring and quantifying their results and even zooming in or working in x-ray mode to see their work in detail.

These and other objects, features and advantages of the present invention may be more clearly understood by considering the following detailed description of a specific embodiment of the invention. In the course of this description, frequent reference will be made to the attached drawings.

DETAILED DESCRIPTION

Figure 1:
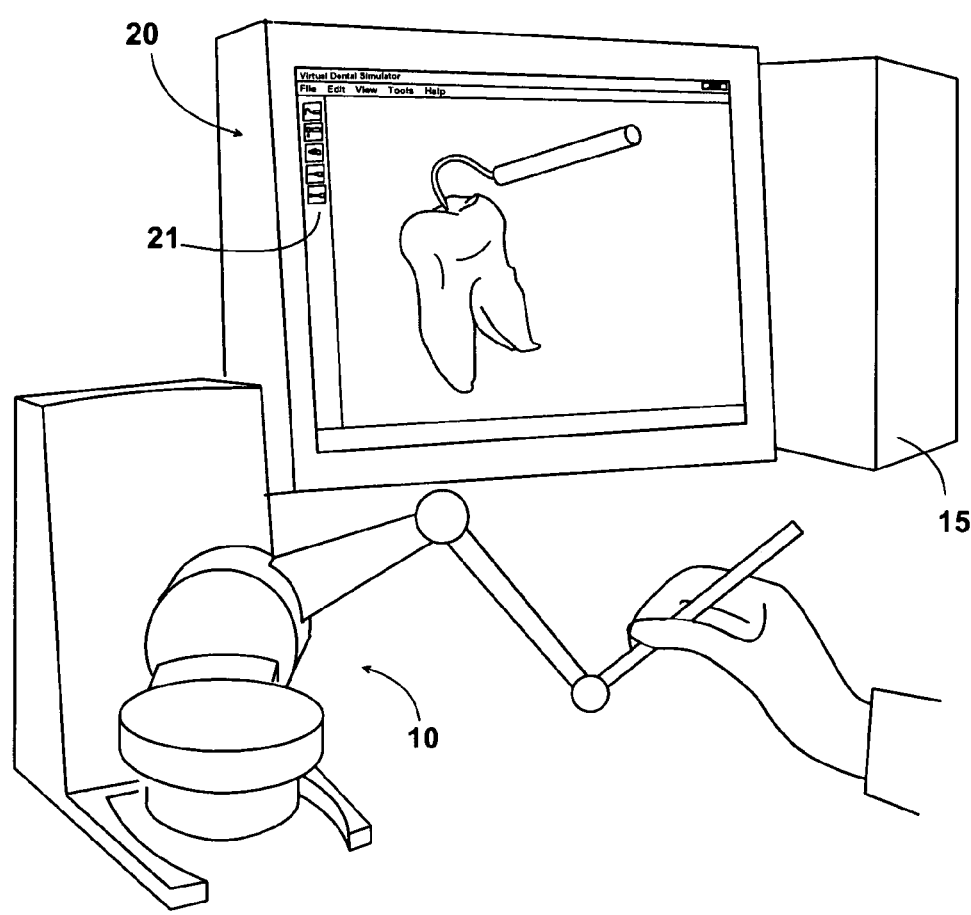
FIG. 1 is a perspective view of the haptic interface, display, and processor used to implement an embodiment of the invention.

The preferred embodiment of the invention is a Virtual Reality Dental Training System (VRDTS) illustrated in FIG. 1 which utilizes the PHANTOM™ haptic interface device 10 connected to a conventional computer or workstation 15. The PHANTOM™ haptic interface is available from Sens-Able Technologies, Inc. of Woburn, Mass., and is described in U.S. Pat. No. 5,898,599 entitled "Force reflecting haptic interface," issued on Apr. 27, 1999 to Thomas H. Massie and J. K. Salisbury, the disclosure of which is hereby incorporated herein by reference, and in "The PHANTOM Haptic Interface: A Device for Probing Virtual objects" by Thomas H. Massie and J. K. Salisbury, *Proceedings of the ASME Winter Annual Meeting, Symposium on Haptic Interfaces for Virtual Environment and Teleoperator Systems*, Chicago, Ill., November 1994. The PHANTOM™ interface provides a broad range of workspace, stiffness and motor force, provides a passive three degrees of freedom positional measurement, and includes a power amplifier and interface card (ISA or PCI) for integration with a conventional PC running Windows NT as well as Silicon Graphics workstations. Software tools available for use with the PHANTOM™ interface include a system development kit "SDK" (the General Haptic Open Software Toolkit), which provides the "physics of touch" engine that takes care of the complex computations, permitting the applications program to deal with simple, high-level objects and physical properties like location, mass, friction and stiffness. These hardware and software tools are used as a framework for the specific dental simulations used in dental training described below. The display may be provided by a conventional monitor as illustrated at 20 to provide a two-dimensional display or, when the monitor 20 is used with liquid crystal eyeglasses (not shown) to transmit separate images to the left and right eyes, as a stereoscopic display showing both the virtual tool and object with depth, perspective and presence in a three-dimensional workspace. Suitable LCD eyeglass systems are available from StereoGraphics Corporation of San Rafael, Calif. 94901.

The Cavity Preparation Simulation

Figure 2:
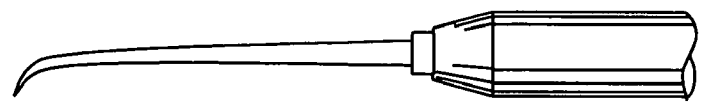
FIGS. 2-5 depict different dental tools whose use is simulated by the invention including a carver (FIG. 2), a pick (FIG. 3), a burr (FIG. 4) and a carrier (FIG. 5).
Figure 3:
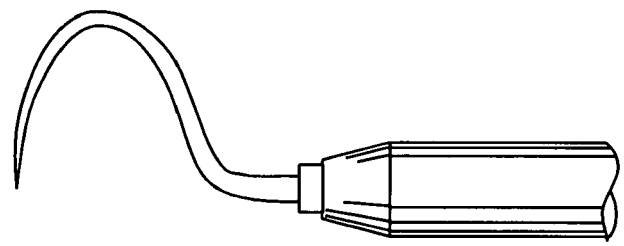
Figure 4:
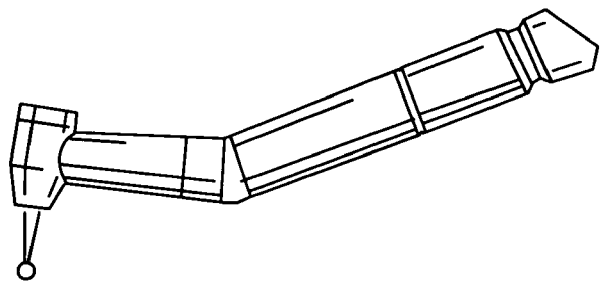
Figure 5:
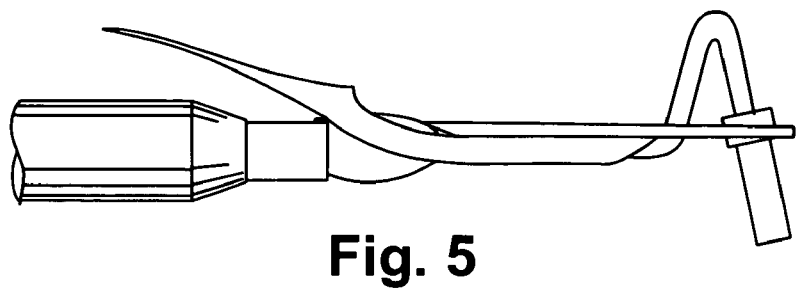

The VRDTS simulates a simple Cavity Preparation (CP) procedure, wherein the student diagnoses, removes and repairs an occlusal cavity ("occusal" refers to the bite surface of a tooth). In performing the procedure, the user manipulates the stylus 11 of the hapic interface shown at 10 while viewing a screen display seen at 20. The student uses simulations of four conventional dental instruments illustrated in FIGS. 2-5: a carver as seen in FIG. 2, a pick as seen in FIG. 3, a drill (burr) as seen in FIG. 4, and a carrier as seen in FIG. 5. Simulations of several different sizes and shapes of picks and carvers, and different drill bits are available to the user and correspond to conventional dentistry tools. See Richard S. Schwartz, DDS, *Fundamentals of Operative Dentistry*, Quintessence Publishing, 1996.

Figure 6:
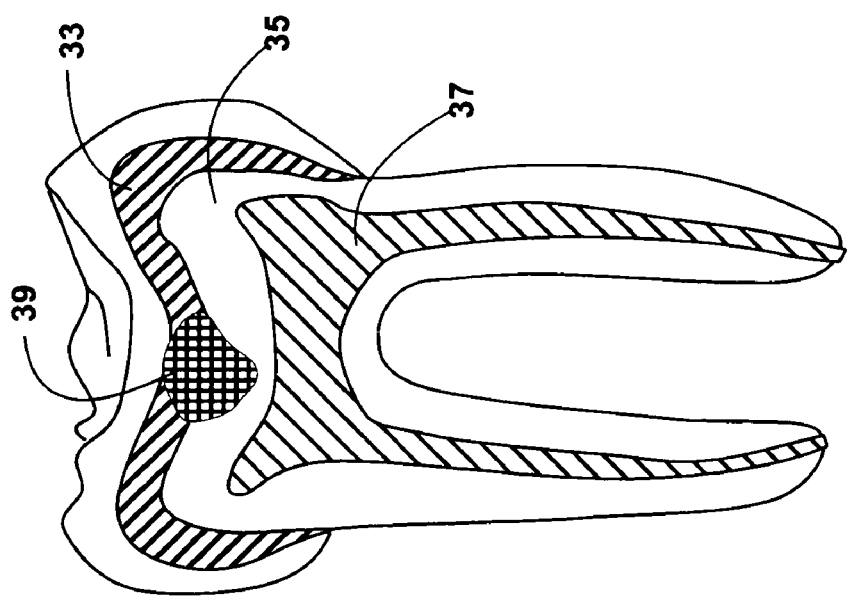
FIG. 6 illustrates the different materials which make up a decayed tooth which is simulated by the invention.

A decayed tooth may be simulated by a model consisting of four different materials as illustrated in FIG. 6: enamel (hard like porcelain) as seen in cross-section at 33, dentin (softer, like ivory) shown at 35, pulp (very soft, like Jello) at 37, and a cavity (somewhat soft, like leather) shown at 39. As discussed hereinafter, the different materials which make up the tooth can be represented by different data values in an attribute grid.

The system may be used to simulate the procedure for treating a simple (occlusal) cavity in a molar as depicted by the screen display illustrated in FIG. 1. The student explores the tooth surface and detects the relatively softer area of the cavity by probing it with the pick (FIG. 3). The haptic interface 10 is used to orient the pick in six degrees-of-freedom, and to present the pick tip forces as the tooth is probed. Surface spring and friction forces are adjusted to simulate the feel of enamel.

The student uses the displayed tool menu seen at 21 in FIG. 1 to select the drill (FIG. 4) to remove the decayed material, ensuring that the walls of the resulting hole are smooth, and that there is a reverse draft angle for retaining amalgam. The haptic interface is used to position the tool tip and remove the voxels from the tooth model that are intersected by the drill head.

The student then selects the carrier tool (FIG. 5), and fills the prepared cavity with amalgam. Amalgam is a constant volume, highly viscous fluid, which sets (becomes as hard as enamel) approximately 15 minutes after application, as simulated by timed changes in the data in the attribute grid which represents the amalgam. Here the haptic interface is used to position the tool tip to add voxels (volume elements) to the tooth model when the stylus button is pressed. The student pushes the amalgam into the cavity preparation until the amalgam has filled it to overflowing. The student then selects one of the carvers (FIG. 2) to contour the amalgam to match the original contour of the tooth.

A dentist depends strongly on touch feedback from the tool tip for diagnosis and positional guidance during procedures. The tooth and tool tips need to be presented in sufficient detail to render the fissures and other surface features of the tooth. Higher resolution tooth models are accordingly used to achieve the detail desired.

The interaction of the pick tip with tooth surfaces is quite realistic. The drill should simulate cutting resistance, cutting (burr side as well as tip) behavior and accuracy (which is related to the resolution of the tooth model). In addition, drilling realism benefits from providing haptic rendering of high frequency vibration. The carrier and carver tools must work with a realistic rendition of amalgam properties. The haptic interface device should be capable of six degree-of-freedom (DOF) force-feedback to enable collision detection of instrument handles. Six degree-of-freedom force feedback should also be used to simulate the torque forces of tooth extraction. However, three degree-of-freedom force-feedback capabilities have been found to be more than adequate for cavity preparation properties.

Modeling Virtual Objects with a Volumetric Representation

In accordance with the invention, the topologies of the virtual models of dental anatomy are represented using volumetric representations. These volumetric representations model the shape and interior of a virtual object as a collection of (usually cubrile) volume elements or voxels. These voxels are stored in a 3D-grid data structure known as the Object Grid. The data values at any given grid location determine whether that grid location is inside, outside or on the surface of the virtual object. The typical convention used is that empty space is specified by a low (usually zero) data value at a grid location and that the presence of virtual material is specified by a high data value. This convention can be switched, however, and the idea and process still holds.

The surface of the virtual model is determined and specified by an analytic isosurface or surface of equal values within the 3D-grid data structure. A particular data value (typically ½ the data range or 128 when using 8-bit data for example) is picked as representing the surface of the virtual model. Using interpolation techniques (typically tri-linear interpolation) to determine the data value between the points in the 3D grid, those points lying at the isosurface value are said to be on the surface of the virtual object. In essence, this is the three-dimensional analog of contour lines in topographic maps. Using the convention that low data value represents empty space, those points that have a data value lower than the isosurface are said to be outside the object and those points that have a data value higher than the isosurface are said to be inside the object.

In common practice, all of the voxels that comprise the virtual object are considered to be a single virtual "material". This virtual material has material attributes that affect its visual and haptic rendering and its response to modification operations by virtual tools and operators.

In the VRDTS system, this concept has been extended such that each individual voxel in the 3D grid can have its own unique material type. In VRDTS this is accomplished by having another 3D-grid data structure, known as the Attribute Grid. This grid is the same size as the Object Grid and the values contained in it act as indexes into a material type lookup table. The material type lookup table contains material attributes that affect the voxel's visual rendering, the haptic rendering and its response to modification operations by virtual tools and operators. The data value associated with points between the grid points in the Attribute Grid can be determined using nearest neighbor approaches or interpolation techniques. A common interpolation technique is tri-linear interpolation. The VRDTS uses the nearest neighbor approach.

This indirect approach to specifying the visual and haptic attributes of the virtual material has two fundamental advantages. First, computer memory usage is significantly minimized. Secondly, collections of virtual materials (i.e., associated visual and haptic attribute parameters) can be easily created. One or more Attribute Grids can be used for a given Object Grid. The VRDTS uses one Attribute Grid.

It should be noted that any attribute of the object can be represented in the Attribute Grid. These attributes are not limited to attributes affecting visual rendering, haptic rendering or the object's response to modification operations by virtual tools and operators. For example, the physiological identity of a particular voxel (e.g., that the voxel represents enamel in a tooth) may be represented in an Attribute Grid. It should be noted that virtual tools and operators can affect the Attribute Grid as well as the Object Grid.

Tool Interactions with Multi-Material Virtual Objects

Figure 7:
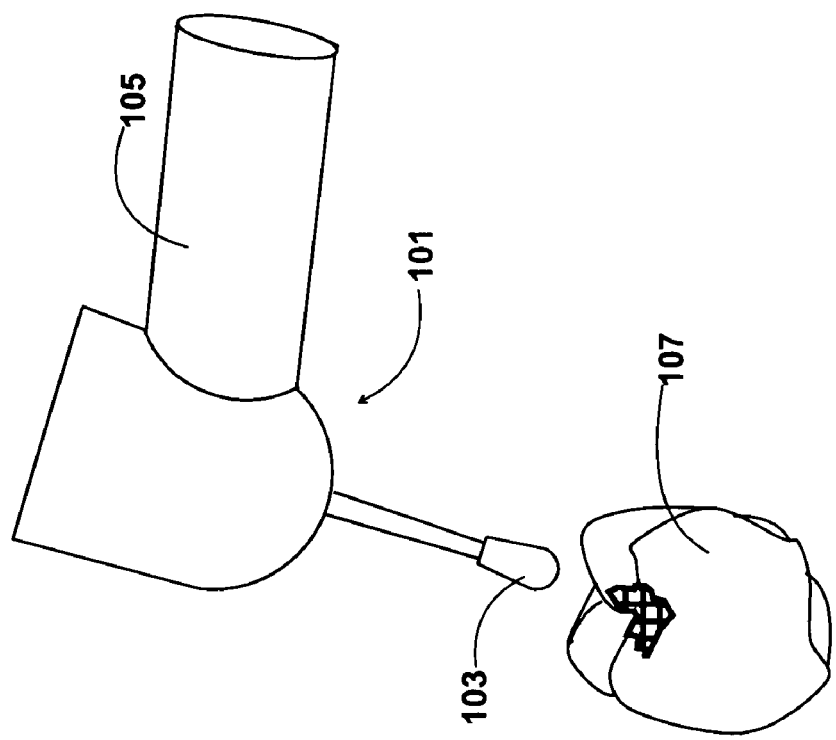
FIG. 7 illustrates a screen display of a virtual tool with virtual object as simulated by the invention.
Figure 8:
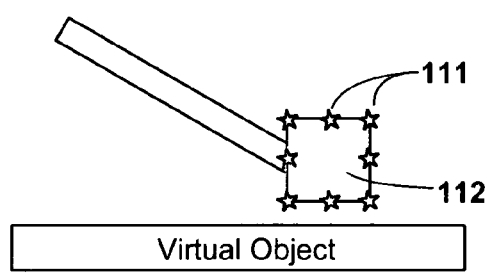
FIG. 8 depicts the common use of feel points in virtual tool.

A virtual tool is designed to interact with the virtual object as tools do in the physical world. As seen in FIG. 4 of the drawings, the virtual tool indicated generally at 101 interacts as a solid object and has a "modification region" at 103 (i.e., that part of the tool that modifies objects) and a handle 105 (i.e., those parts of the tool that do not typically modify objects). Each type of tool has a shape and modification characteristics/capabilities that, together with the virtual object's properties, determine its action on virtual objects In common practice, the modification region of the virtual tool is that part of the tool that interacts with and changes (e.g., adds or removes material) the virtual object. For example, FIG. 7 shows a virtual dental drill tool. In this case, the modification region 103 is that part of the tool, the "drill bit," that actively removes material from the virtual object 107 (i.e., the virtual tooth model). Also in common practice, interaction forces are generated during virtual tool/virtual object interactions. These interaction forces are computed by modeling the surface of the virtual tool as a collection of points that are referred to as feel points. During iterations of the force-feedback loop, the position of each feel point associated with the virtual tool is compared to the isosurface of the virtual object. If a feel point is within the virtual object (as determined by its isosurface) then an interaction force is computed for that feel point. The interaction forces computed for all the feel points associated with the virtual tool are combined and an aggregate interaction force is fed back to the user via the haptic interaction device. In common practice, the feel points are located on the surface of the modification region 103. FIG. 8 provides a schematic illustration of a virtual tool and a virtual object where the feel points (positioned as shown by the five-pointed stars 111) are allocated at the exterior surface of the modification region 112.

Figure 9:
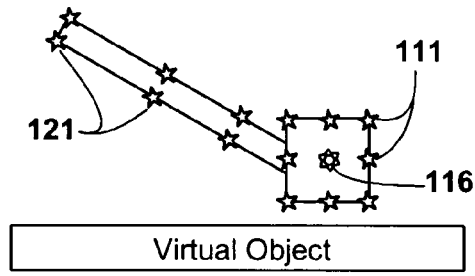
FIG. 9 illustrates the use of feel points and sensor points.

In the VRDTS system, this common practice has been substantially refined and extended. As shown in FIG. 9, VRDTS extends the virtual tool model to represent handle region(s} at 121, modification region(s)at 112 , feel point(s) 111 and sensor point(s) 116. Feel points are added to the handle region(s) so that the user can feel virtual tool/virtual object interaction forces with the handle portions of the tool.

Feel Point Placement

A more subtle and powerful extension is the use of feel point placement relative to the modification region of the virtual tool to control tool behavior (i.e., modification behavior and interaction feel). The net effect of feel points is to generate forces such that the spatial region determined by the feel points does not tend to penetrate the virtual object. The placement of feel points relative to the modification region of the virtual tool, therefore, can be used to increase, decrease or guide the virtual object modification that normally occurs with the modification region intersects with the virtual object.

Figure 10:
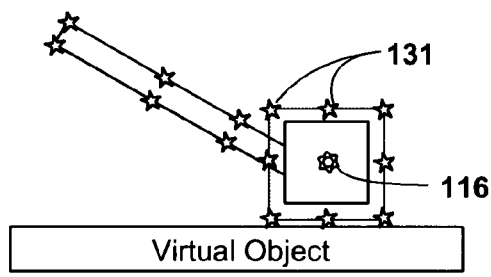
FIG. 10 depicts the use of feel points around larger version of a modification region.

Feel points surrounding a larger version of the modification region. If the feel points are located such that they are offset outwardly from the surface of the modification region, as illustrated in FIG. 10 at 131, several things can occur depending on the action of the modification region:

If the modification region removes or smoothes material where it overlaps with the virtual object, the effect of this feel point configuration is to require the user to press against the surface of the virtual object with more force in order to remove or smooth material. This means that the virtual tool can be used to explore the surface of the virtual object if the user presses lightly (i.e., applies low forces) using the haptic interface device driving the virtual tool. If the user presses more heavily (i.e., higher forces), the modification region will intersect the virtual object and it will be modified. In general, the more the feel points are spaced from the modification region, the higher the forces that will be required in order to cause modification of the Virtual object to occur.

If the modification region adds material, the effect of this feel point configuration is to maintain a gap between the material added by the virtual tool and the existing surface of the virtual object. Moreover, the user can use the interaction forces to both maintain and vary the gap between the added material and the existing virtual object. The greater offset that the feel points are from the modification region, the greater the gap that is maintained for a given interaction force. In order to make the gap smaller, the user needs to press harder.

Figure 11:
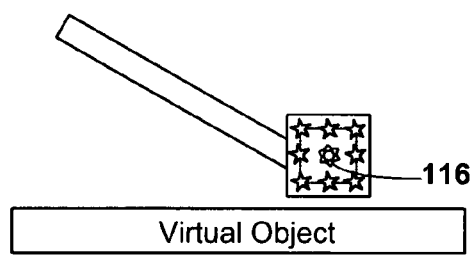
FIG. 11 shows feel points around a smaller version of modification region.

Feel points surround a smaller version of the modification region. If the feel points are located such that they are offset inwardly from the surface of the modification region towards as illustrated at 141 in FIG. 11, several things can occur depending on the action of the modification region:

If the modification region removes or smoothes material where it overlaps with the virtual object, the effect of this feel point configuration is to make it easier to remove or smooth material. In other words, the user has to impart less force during the virtual tool/virtual object interaction before the modification region has its effect. With sufficient offset towards the inside of the modification region, the feel point configuration is such that the virtual tool will "sink" into the virtual object quite quickly.

If the modification region adds material, the effect of this feel point configuration is to add material that intersects with the surface of the existing virtual object.

Figure 12:
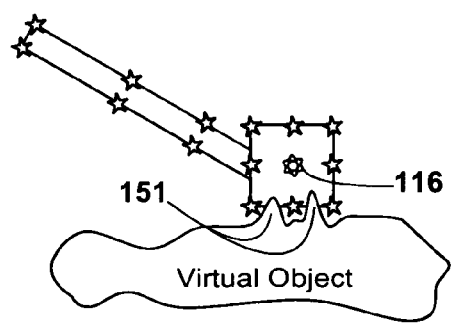
FIG. 12 illustrates feel point density.

Density of feel points. The spatial density of feel points can be used to filter the size of features that can be affected by the modification region. For example, as shown in FIG. 12, a given population of feel points on the modification region surface makes it easier to remove any virtual object feature, such as those seen at 151, whose cross section is smaller that the spacing between the feel points. If the feel points are relatively sparse, the modification region more easily affects larger features on the virtual object. If the feel points are relatively dense, only smaller features can be affected.

Figure 13:
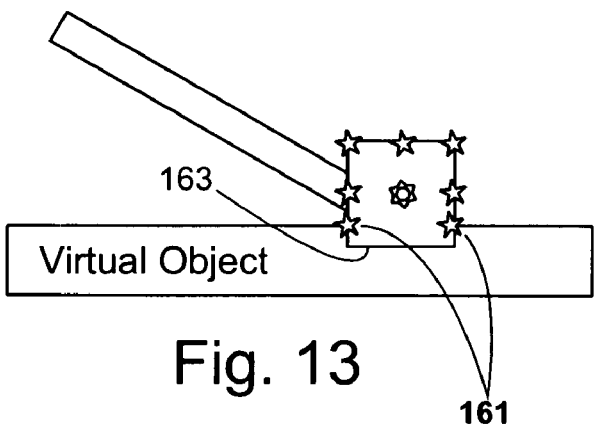
FIG. 13 shows the use of feel points as guides (channel guide example).
Figure 14:
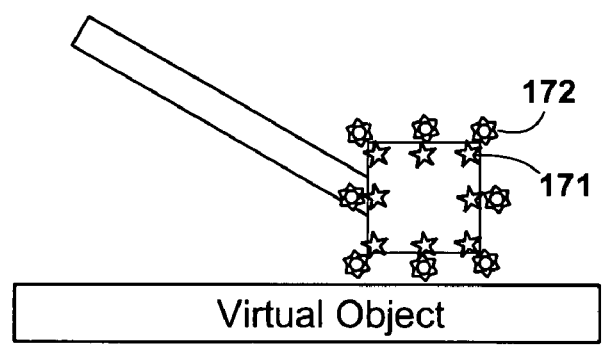
FIG. 14 illustrates a single feel point approach.

Feel points as guides. Feel points can be located such that they do not strictly surround a larger or smaller version of the modification region. When employed in this fashion, the feel points can act to guide or stabilize the operation of a virtual tool. For example, FIG. 13 shows a feel point configuration that tends to guide the virtual tool, in "removal" mode, in making "channels" of constant depth in the virtual object. The feel points at 161 are displaced upwardly from the projecting operative bottom surface 163 of the modification region allowing the projecting operative surface 163 to move into the virtual object until the feel points 116 intersect the surface of the virtual object.

Sensor Points

As previously mentioned, in common practice all of the voxels that comprise the virtual object are considered to be a single virtual "material". This virtual material has material attributes that affect its visual and haptic rendering and its response to modification operations by virtual tools and operators. The concept of "sensing" the material type of given voxel, therefore, is not an issue. In the VRDTS system, however, this concept has been extended such that each individual voxel in the 3D grid can have its own unique material type. Mechanisms for sensing the material type of a given voxel and for using this information to affect the action of the virtual tool, therefore, are needed in the VRDTS system.

In the VRDTS system, a sensor point (shown at 116 in FIGS. 9-14) is used in determining the "identity" of the virtual material and its effect on virtual tools. A virtual tool can have one or more sensor points associated with it. Each sensor point determines the virtual material of the virtual object at that point is space. The virtual material associated with points between the grid points in the attribute grid can be determined using nearest neighbor approaches or interpolation techniques, such tri-linear interpolation. The information from all the sensor points associated with a virtual tool as used to help determine the virtual tool's behavior.

Two approaches to using sensor points to help determine virtual tool behavior have been used. The first approach, as shown in FIGS. 9-14, is to use as single sensor point for the virtual tool. Typically, this sensor point is located at the center of mass of the virtual tool's modification region. The virtual material identity is determined at the sensor point and the tool behaves appropriately. This approach has the advantage of simplicity. Its major limitation, however, is that transitions from one virtual material to another are not sensed until the sensor point itself makes the material transition. The single Sensor Point approach, therefore, tends to be only useful for virtual tools with relatively compact and symmetric modification regions.

The second approach to the use of sensor points involves associating one or more sensor points with each feel point. In the example seen in FIG. 14, the feel point 171 is paired with a sensor point 172. In this approach the virtual material sensed by the sensor points associated with a feel point affect the interaction force behavior of the feel point. Where a single sensor point is associated with a single feel point, the characteristics of the virtual material sensed by the sensor point determine the interaction force contributions of the feel point to the overall interaction force. The overall interaction force is fed back to the user from the virtual tool through the haptic interaction device. As soon as the sensor point enters a new virtual material, the associated feel point's interaction forces are changed to those of the new virtual material.

More than one sensor point can be associated with a feel point. The parameters used to determine the feel points' contributions to the virtual tool's overall interaction force are computed as a weighted average of the parameters determined by the virtual material sensed at each sensor point. Typically, the weight given to a sensor point is inversely proportional to its distance to the feel point. In other words, sensor points that are farther from the feel point have less effect on the feel point's interaction force parameters than sensor points that are closer to the feel point. Other methods for computing the effect of multiple sensor points on a single feel point, of course, can be used in this overall framework. It should also be noted that the same sensor point can be associated with more than one feel point within this overall framework.

Figure 15:
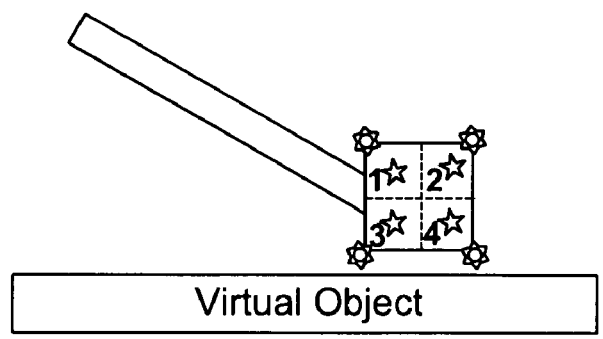
FIG. 15 illustrates a multiple sensor point approach using a one sensor point per feel point example.

A refinement to the second approach is to associate sensor points with a sub-region of the modification region. As previously mentioned the behavior of the modification region is partially determined by the virtual material with which it is interacting. For example, if the modification region's behavior is to remove material, its rate of removal is dependent on the type of material. Some materials (i.e., "harder" materials) cause a lower rate of removal to be used and other materials (i.e., "softer" materials) cause a higher rate of removal to be used. In the refinement, the modification region is logically partitioned into multiple sub-regions. One or more sensor points determine the virtual material that is to be associated with a sub-region of the modification region. The behavior of the overall modification region is determined by using a weighted average of the material parameters determined for each sub-region. FIG. 15 shows an example where the modification region is subdivide into four subregions, and a sensor point/feel point pair is assigned to each region. In this example, each sensor point determines the virtual material to be associated with a sub-region of the modification region. The Typically, the weight given to each sub-region is proportional to its volume. If a virtual material removal tool is moving from a "soft" region to a "hard" region of the Virtual object, for example, the behavior of the virtual tools modification region will tend more and more towards the behavior to be experienced if the virtual tool was completely within the "hard" region as more and more modification region sub-regions (and their associated sensor points) enter the "hard" region of the virtual object. It should be noted that, other methods for computing the effect of each sub-region on the overall modification region can be used in the overall framework that has been described.

CONCLUSION

It is to be understood that the specific implementations of the invention that have been described are merely illustrative applications of the principles of the invention. Numerous modifications may be made by those skilled in the art without departing from the true spirit and scope of the invention.

What is claimed is:

1. A method for simulating dental procedures for training dental students comprising, in combination, the steps of:
    storing volumetric data defining the location of at least one isosurface in a model of a tooth,
    storing point data defining the positions of a plurality of feel points that define the surface of a model of a dental tool having a handle,
    employing a digital computer consisting of a processor and a display device to display said model of a tooth,
    employing said processor and said display device to display said model of a dental tool having a handle, and
    employing a haptic interface device including a force-feedback stylus that is manually moveable by a dental student and is coupled to said digital computer to move the said model of a dental tool with respect to said model of a tooth, and
    employing said processor to compare said location of at least one isosurface in said model of a tooth with said positions of said feel points that define the surface of a model of a dental tool having a handle to calculate and apply computer-controlled interaction forces to said force-feedback stylus to simulate the feel of said dental tool having a handle to haptically simulate a dental procedure.

2. The method set forth in claim 1 wherein said dental tool is a pick having a pick handle and wherein said force-feedback stylus is movable by said dental student to simulate the motion of said pick handle.

3. The method set forth in claim 1 wherein said dental tool is a drill having a drill handle and wherein said force-feedback stylus is movable by said dental student to simulate the motion of said drill handle.

4. The method set forth in claim 1 wherein said dental tool is an amalgam carrier having a carrier handle and wherein said force-feedback stylus is movable by said dental student to simulate the motion of said carrier handle.

5. The method set forth in claim 1 wherein said dental tool is a carver having a carver handle and wherein said force-feedback stylus is movable by said dental student to simulate the motion of said carver handle.

6. The method set forth in claim 1 wherein said model of a dental tool is selected by said student from a plurality of available dental tools, each of which has a handle, and wherein said force-feedback stylus is movable by said dental student to simulate the motion of the handle of each of said tools.

7. The method set forth in claim 6 wherein said plurality of dental tools comprises at least a pick, a carver, and a drill.

8. The method set forth in claim 6 wherein said plurality of dental tools comprises at least a pick, a carver, a drill and an amalgam carrier.

9. The method set forth in claim 1 wherein said display device renders said model of a tooth and said model of a dental tool in a stereoscopic three dimensional display.

10. The method set forth in claim 1 wherein said a haptic interface device that is manually moveable by a dental student includes a moveable force-feedback stylus that is moveable in at least three degrees of freedom.

11. The method set forth in claim 1 wherein said display device renders said model of a tooth volumetrically as a solid object consisting of a collection of volume elements.

12. The method set forth in claim 11 wherein said model of a tooth is subdivided into different regions simulating different materials specified by different material type data values associated with said different regions.

13. The method as set forth in claim 1 wherein said model of a dental tool represents a drill, said method further including the step of removing portions of said model of a tooth that are intersected by said drill.

14. The method as set forth in claim 1 wherein said model of a dental tool represents an amalgam carrier, said method further including the step of adding material to portions of said model of a tooth in the vicinity of said amalgam carrier.

15. The method for simulating dental procedures as set forth in claim 11 wherein said digital computer further includes means for storing volumetric object grid data specifying the attributes of at least selected ones of said volume elements.

16. The method for simulating dental procedures as set forth in claim 14 further including the step of responding the movement of said model of a dental tool with respect to said model of a tooth by modifying said volumetric object grid data.

17. The method for simulating dental procedures as set forth in claim 15 further including the step of responding the movement of said model of a dental tool with respect to said model of a tooth by modifying said volumetric object grid data and said data specifying the attributes of at least selected ones of said volume elements.

18. The method for simulating dental procedures as set forth in claim 17 wherein said digital computer further includes means for storing data for representing the shape and character of a modification region of said model of a dental tool to control the manner in which said volumetric object grid data is modified.

19. Apparatus for simulating dental procedures for training a dental student comprising, in combination, a digital computer consisting of at least a processor, a display device, a haptic interface including a moveable force-feedback stylus manipulatable by said student, and storage means for storing:
    volumetric object grid data for representing a tooth as the position and attributes of a collection of volume elements in three-dimensional space, tool definition data for representing the position of feel points on the surface of a dental tool in three-dimensional space, and a simulation program executable by said processor in response to the movement of said stylus for moving a displayed model of said dental tool with respect to a displayed model of said tooth and for comparing the position of said feel points to the position of said volume elements for calculating and applying computer-controlled interaction forces to said force-feedback stylus to simulate the feel of said dental tool to haptically simulate a dental procedure.

20. Apparatus as set forth in claim 19 wherein said tool definition data specifies the shape and location of a modification region of said dental tool and wherein said simulation program includes means for modifying said object grid data for volume elements in the vicinity of said modification region.

21. Apparatus as set forth in claim 20 wherein said simulation program further includes means for modifying said object grid data representing said attributes of said volume elements in the vicinity of said modification region.

22. Apparatus as set forth in claim 21 wherein said simulation program includes means for increasing said interaction forces applied to said stylus when said at least one of said feel points is moved near to one or more of said volume elements representing said tooth.

23. Apparatus as set forth in claim 22 wherein at least some of said feel points define the location of a handle portion of said dental tool.

24. Apparatus as set forth in claim 22 wherein at least some of said feel points are positioned outwardly from said modification region to increase the amount of force that the student must apply to said stylus to modify data representing said tooth.

25. Apparatus as set forth in claim 22 wherein at least some of said feel points are positioned inwardly into said modification region to decrease the amount of force that the student must apply to said stylus to modify data representing said tooth.

26. Apparatus as set forth in claim 22 wherein as least some of said feel points are spaced from adjacent ones of said feel points by a distance larger than the dimension of projecting portions of said tooth thereby facilitating the removal of said projecting portions.

27. Apparatus as set forth in claim 22 wherein at least some of said feel points are positioned relative to said modification region to guide the movement of said modification region with respect to said model of a tooth.

28. Apparatus as set forth in claim 21 wherein said tool definition data further includes the specification of the location of one or more sensor points relative to said modification region for determining the attributes of volume elements of said tooth located at said sensor points.

29. Apparatus as set forth in claim 28 wherein said tool definition data includes the specification of the location of a single sensor point located substantially at the center of mass of said modification region.

30. Apparatus as set forth in claim 28 wherein said tool definition data further includes the specification of the location of one or more sensor points at or near the location of one or more selected ones of said feel points for determining the attributes of volume elements of said tooth at said sensor points.

* * * * *